United States Patent
Dasika Venkata Devi et al.

(10) Patent No.: US 11,025,610 B2
(45) Date of Patent: Jun. 1, 2021

(54) DISTRIBUTED LEDGER-BASED PROFILE VERIFICATION

(71) Applicant: MICROSOFT TECHNOLOGY LICENSING, LLC, Redmond, WA (US)

(72) Inventors: Phanindra Krishna Rao Dasika Venkata Devi, Hyderabad (IN); Mukunda Dwarkanath Singaiyengar Heragu, Hyderabad (IN); Ramprasath Lekshmana Sarma, Hyderabad (IN); Bhaveshkumar Rameshchandra Rana, Vadodara (IN); Palli Madhusudhana Reddy, Andhra Pradesh (IN); Honey Krishnan Poomalaveetil, Hyderabad (IN); Uday Sai Jagannadh Nandipati, Hyderabad (IN); Ganesh Prasad Raokutam, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 16/197,052

(22) Filed: Nov. 20, 2018

(65) Prior Publication Data

US 2020/0162448 A1 May 21, 2020

(51) Int. Cl.
*H04L 29/06* (2006.01)
*G06F 16/182* (2019.01)
*H04L 29/08* (2006.01)

(52) U.S. Cl.
CPC ........ *H04L 63/0823* (2013.01); *G06F 16/182* (2019.01); *H04L 63/102* (2013.01);
(Continued)

(58) Field of Classification Search
CPC . H04L 63/0823; H04L 63/102; H04L 63/126; H04L 67/10; H04L 67/306; G06F 16/182
(Continued)

(56) References Cited

U.S. PATENT DOCUMENTS

| 10,102,526 | B1* | 10/2018 | Madisetti | ............ G06Q 20/389 |
| 2009/0222902 | A1* | 9/2009 | Bender | ................. G06F 21/33 |
| | | | | 726/10 |

(Continued)

FOREIGN PATENT DOCUMENTS

WO 2017066715 A1 4/2017

OTHER PUBLICATIONS

Poorni et al., "DIGICERT: A Secured Digital Certificate Application using Blockchain through Smart Contracts," doi: 10.1109/ICCES45898.2019.9002576, 2019, pp. 215-219 (Year: 2019).*

(Continued)

*Primary Examiner* — Peter C Shaw
(74) *Attorney, Agent, or Firm* — NovoTechIP International PLLC

(57) ABSTRACT

The described embodiments employ aspects of distributed ledger technologies to facilitate electronic verification and sharing of profile information. Nodes maintaining a distributed ledger include—a first node that generates profile data, and second nodes that generate certificates verifying the generated profile data. The first node can be employed by a client device to generate profile data associated with a first identifier and referencing a second identifier for inclusion on a personal profile, such as a social media webpage. The client device can send the first node a request to have the profile data verified by the referenced second identifier. The profile data can be stored on a distributed ledger so that a second node associated with the second identifier can generate, on behalf of the second identifier, a certificate that (Continued)

verifies the stored profile data. The certificate can be stored on the distributed ledger, so that the first node can access the certificate and provide the client device with an indication that the stored profile data was verified. The first node can also generate additional certificates corresponding to the stored profile data for storage on the distributed ledger, providing selective access to the verified stored profile data.

20 Claims, 7 Drawing Sheets

(52) U.S. Cl.
CPC ............ H04L 63/126 (2013.01); H04L 67/10 (2013.01); H04L 67/306 (2013.01)
(58) Field of Classification Search
USPC .......................................................... 713/175
See application file for complete search history.

(56) References Cited

U.S. PATENT DOCUMENTS

| | | | |
|---|---|---|---|
| 2011/0154027 A1* | 6/2011 | Liu | ....................... H04L 9/3263 713/158 |
| 2018/0117447 A1 | 5/2018 | Tran et al. | |

OTHER PUBLICATIONS

Cheng et al., "Blockchain and smart contract for digital certificate," doi: 10.1109/ICASI.2018.8394455, 2018, pp. 1046-1051 (Year: 2018).*
"International Search Report and Written Opinion Issued in PCT Application No. PCT/US2019/061053", dated Mar. 27, 2020, 11 Pages.

* cited by examiner

DISTRIBUTED LEDGER-BASED PROFILE VERIFICATION

BACKGROUND

A variety of social networking services enable users to easily build personal profile pages for purposes of interpersonal networking. Whether for personal or business use, such services generally fail to take reasonable measures to authenticate the veracity of a user's profile information. Users can easily make false claims about themselves on a profile page, and there is generally no way to verify or debunk these falsified claims without expending extraneous resources. The inability to verify or authenticate personal claims made by users has led to a variety of issues, such as catfishing, identity theft, phishing, resume fraud, and more.

SUMMARY

Embodiments of the present invention generally relate to profile verification. More specifically, embodiments describe systems and techniques for utilizing various aspects of distributed ledger technologies to selectively store, request, and share verified personal information.

In various embodiments, a social profile verification system includes a plurality of nodes that collectively maintain a distributed ledger, such as a blockchain. The nodes can, among other things, communicate with one another to verify, update, and maintain the distributed ledger, a copy of which is independently stored on each node. Amongst the nodes, some of the nodes can include specific components and/or have unique features that serve a purpose for storing, verifying, updating, and/or sharing profile information amongst users and/or entities.

The nodes can include, among other things, a public user node that provides an interface (e.g., a website) for users to, among other things, create, view, modify, and/or share, via their client devices, profiles with various claims about themselves. The user can request that a first entity referenced in a claim, such as an employer referenced in a claim regarding the user's employment history, verify the claim. Based on the request, the public user node can generate a transaction that causes the plurality of nodes to store the claim onto the distributed ledger.

The nodes can further include one or more public entity nodes and/or private entity nodes. A private entity node is a node that is associated with a particular entity, such as the referenced first entity, that can, among other things, enables the entity to create, view, and/or verify, via an entity client device associated with the entity, claims for user profiles in which the entity is referenced. A public entity node, on the other hand, is a node that is associated with multiple entities, which provides an interface (e.g., a website) for each entity to, among other things, create, view, and/or verify, via an associated entity client device, claims for user profiles in which the entity is referenced. The private or public entity node associated with the first entity (the "first associated entity node") can, among other things, provide the first entity, via an associated entity client device, a generated notification indicating that a request to verify a claim is stored on the distributed ledger based on a determination that the stored claim references the first entity. The first associated entity node can receive a request from the referenced first entity, via the associated entity client device, to verify the claim based on the provided notification. Based on the received request, the first associated entity node can generate a first digital certificate corresponding to the claim and on behalf of the referenced first entity, whereby the generated first digital certificate is issued from the referenced first entity and to the user associated with the claim. The first associated entity node can generate a transaction that includes the generated first digital certificate, causing the plurality of nodes to store the generated first digital certificate onto the distributed ledger.

The public user node can then determine that the first digital certificate is stored on the distributed ledger based on the user being a recipient of the first digital certificate. Based on the determination, the public user node can send a generated notification to the user client device indicating that the claim was verified by the referenced entity. The user, via the user client device, can then send a generated request to the public user node, to share the verified claim with a second entity, such as a potential employer. The user node can, based on receiving the request, generate a second digital certificate corresponding to the verified claim (e.g., the first digital certificate) on behalf of the user, whereby the generated second digital certificate is issued from the user to the second entity.

The private or public entity node associated with the second entity (the "second associated entity node") can determine that the second digital certificate is stored on the distributed ledger based on the second entity being a recipient of the stored second digital certificate. Based on the determination, the second associated entity node can, among other things, provide an entity client device associated with the second entity, with the stored second digital certificate indicating that the claim, referencing the first entity, was verified by the referenced first entity.

In various embodiments described herein, a generated digital certificate issued from a first party (e.g., user, entity) to a second party (e.g., user, entity) enables the second party to view the claim that is a subject of the generated digital certificate. Moreover, a party can employ an associated node (e.g., entity node, user node) to, among other things, access, view, generate, or revoke digital certificates generated via their respective associated node and issued by the party. In this regard, a party can employ an associated node to selectively provide another party with access to profile claims stored on the distributed ledger.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
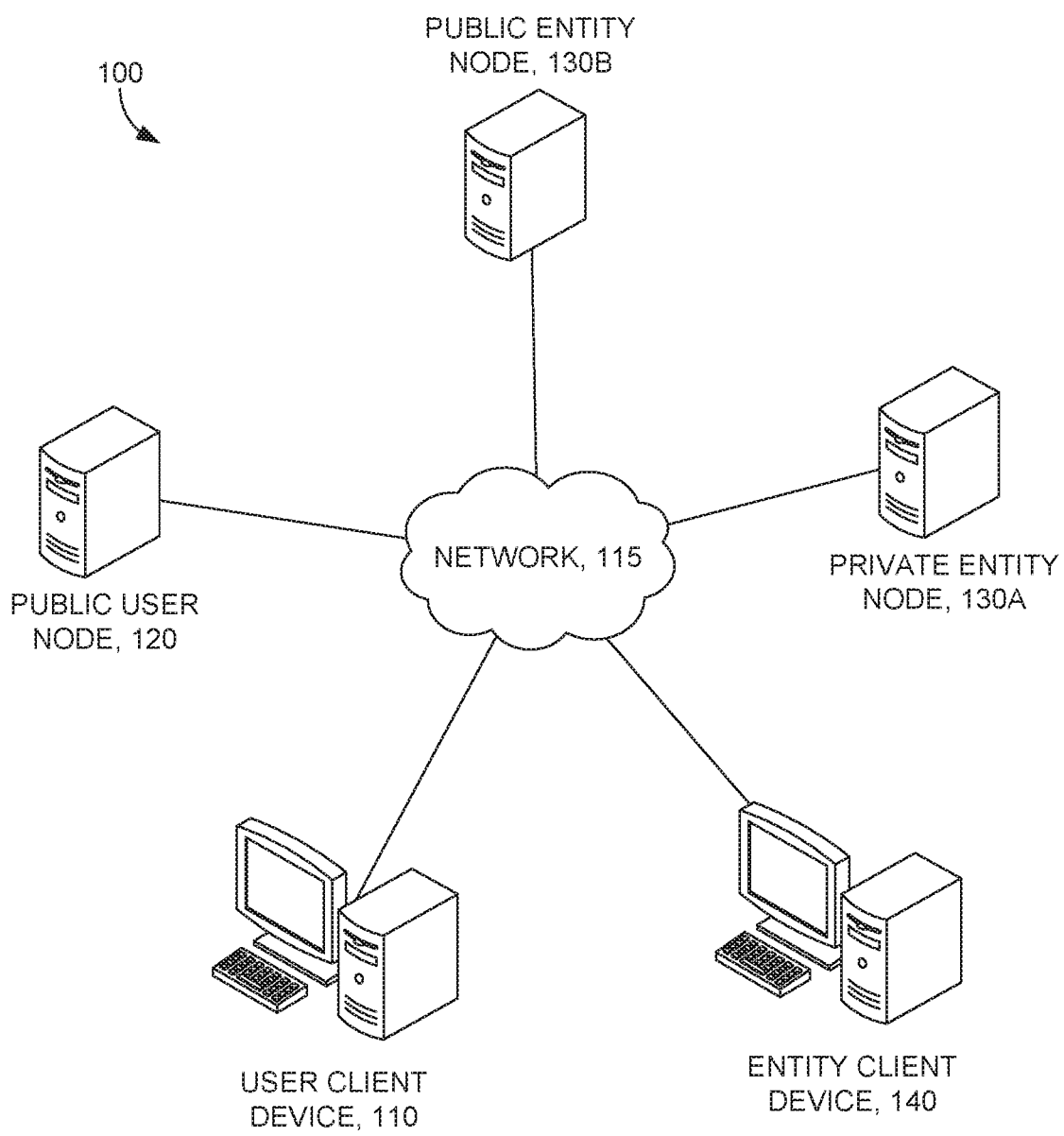
FIG. 1 is an exemplary system diagram in accordance with some embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The ability for transacting parties to establish trust over the Internet is generally based on the availability of a trusted third-party, tasked with ensuring that each transacting party is acting in good faith. Trusted third-parties, however, typically limit their services to very specialized needs. For instance, an escrow agent can provide trusted third-party services for holding payments from buyers to sellers, releasing such payments to the sellers upon receiving notice from the buyers that the subject goods for which the payments were made are satisfactory. The relatively recent introduction and adoption of distributed ledger technologies, such as blockchain, has provided a way to decentralize such trust services. In other words, while a trusted third party is typically relied upon to oversee transactions between counterparties, independent computers spread out over the world can now collectively provide transactional oversight in an automated and inexpensive fashion.

Personal claims made over the Internet are an entirely different beast, however. A variety of social networking services provide users with an easy way to build personal profile pages, such as websites, for purposes of interpersonal networking. Whether for personal or business purposes, these services generally fail to take reasonable measures to authenticate the veracity of a user's profile information. The failure is not to the fault of companies providing such services, however, as the task is an enormous one. As such, users can easily make false claims about themselves on a profile page, and there is generally no technical means provided for verifying or debunking these claims. More specifically, a candidate (e.g., a job seeker) could easily build a profile page on one of these websites, and falsify a claim about his or her job experience on their associated profile page. The false claim can mislead recruiters or potential employers as to the information's veracity, leading to wasted resources in various capacities.

In the same accord, and by way of another example, potential employers oftentimes engage third-party providers to perform background verification processes before hiring a candidate. The engagement of the third-party provider proves necessary, however, as history has shown that candidates can easily falsify their information on resumes and other like mediums, such as a profile page. In this regard, there is a clear, albeit necessary, disconnect in trust a potential employer places onto a candidate. Typically, the third-party provider must verify all claims made by the candidate, including previous employment history, educational history, credit history, and/or criminal history, among other things. This verification process can be costly in both time and resources. Such resources are proven to be wasted entirely, however, when claims are proven falsified based on the background verification process performed by the potential employers or third-party providers.

Embodiments of the present disclosure are generally directed to systems and techniques that leverage aspects of distributed ledger technologies to provide end-to-end digitization and automation of verifying profile claims. The described embodiments provide improved veracity and trustworthiness of claims, made by users, by providing a system that enables users to generate a profile dataset associated with the user for storage on a distributed ledger. A generated profile dataset can include, among other things, a personal claim made by the user (e.g., a factual statement, employment history, academic history), and can further include a reference to a verifying entity, such as a previous employer or academic institution by way of example. Unlike conventional methodologies, where a potential employer would perform a background check of an individual, the user himself or herself can employ the disclosed system to request that an entity, referenced in the generated profile dataset, verify the veracity of the personal claim included therein.

In various embodiments, the system can notify the entity referenced in the claim awaiting verification, based on a determination that the distributed ledger has stored thereon the generated profile dataset, which references the entity. In this regard, the referenced entity can employ the system to generate a digital certificate corresponding to the generated profile dataset on behalf of the referenced entity itself, whereby the digital certificate is issued from the referenced entity and issued to the user associated with the generated profile dataset. The system can then store the generated digital certificate onto the distributed ledger. The generated digital certificate, which verifies the claim included in the stored profile dataset, is also stored onto the distributed ledger such that the associated user can view and/or share the verified claim with other entities. Due to the immutable nature of distributed ledgers, the user cannot modify the stored profile dataset (i.e., the verified claim). Provided the foregoing, embodiments of the present invention provide various systems and techniques that enables a user to share a profile dataset, both immutable and verified, with other users and/or entities, such that the other users and/or entities can trust the veracity of the shared profile dataset. To this end, the disclosed embodiments describe a trusted and distributed system where users and entities alike can trust the information published or shared by other users and entities, without relying on a third-party provider, and without taking on the inherent risks associated with falsified information.

Turning now to FIG. 1, a schematic depiction is provided illustrating an exemplary system 100 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 depicted in FIG. 1 includes a user client device 110 that can communicate with a public user node 120 (also referenced herein as a "first node") over a network 115, such as the Internet. The system 100 also includes an entity client device 140 that can communicate with an entity node (also referenced herein as a "second node"), which can include a private entity node 130A or a public entity node 130B. Each of the user client device 110, public user node 120, entity client device 140, private entity node 130A, and public entity node 130B can include a computing device, as described in more detail with respect to FIG. 7.

The system 100 preferably includes a plurality of user client devices 110 that are each associated with one of a plurality of users, and a plurality of entity client devices 140 that are each associated with one of a plurality of entities. As referenced herein, the term "user" refers to a person that is employing the system 100 to generate profile datasets, request that the generated profile datasets be verified, and/or share the verified profile datasets with other users and/or entities, among other things. The term "entity" refers to a representative person (e.g., an administrator) associated with an entity that is employing the system 100 to view profile datasets awaiting verification by the entity, and to verify such profile datasets, among other things.

In some embodiments, an entity client device 140 can be associated with a private entity node 130A, in that only the entity client device 140 has access to the private entity node 130A. In a preferred but non-limiting embodiment, the private entity node 130A is co-located with the entity client device 140, each being in communication with at least one another via a private network, such as a LAN or VPN. In some other embodiments, a plurality of entity client devices 140 can be associated with a public entity node 130B, in that each of the plurality of entity client devices 140 can only access the public entity node 130B with an account and corresponding credentials authenticated by the public entity node 130B.

In various embodiments, the public user node 120, private entity node 130A, and public entity node 130B (hereinafter collectively referred to as "the nodes") are in communication with at least one other node of the nodes, via network 115, each operating as peer devices that collectively maintain a distributed ledger. In a preferred embodiment, system 100 includes a plurality of the nodes, whereby the system 100 includes one or more of each the public user node 120, private entity node 130A, and public entity node 130B.

In various embodiments, each user or entity can be associated with a unique identifier, such as a user identifier ("user ID") or an entity identifier ("entity ID"), respectively. The unique identifier can be created and associated with the user or entity by one of the nodes associated therewith, preferably during an account creation process whereby the user or entity accesses, via an associated client device, the associated node to generate and establish credentials (e.g., unique identifier, password) to access the associated node. In this regard, any reference to a device or component associated with a user or entity, described in various embodiments of the present disclosure, can be interpreted as the device or component also being associated with a user ID or entity ID, respectively.

In some embodiments, a public user node 120 can host or provide an interface (e.g., a website, application, or API) for a user to, among other things, create, view, modify, and/or share, via an associated user client device 110, one or more portions of a profile (i.e., datasets) associated with the user. As noted, a dataset can include a claim (e.g., a factual statement, employment history, educational background, other credentials) about the user, and can further reference an entity (e.g., a previous employer) that can verify the claim. The user, via an associated user client device 110, can generate a request for communication to the public user node 120, requesting that the entity referenced in the dataset, verify the dataset (i.e., the included claim). Based on receiving the request, the public user node 120 can generate a transaction that causes the plurality of nodes to store the dataset onto the distributed ledger, a copy of the distributed ledger being stored in a memory of each of the nodes 120, 130A, 130B.

In some embodiments, an entity can be associated with at least one of a private entity node 130A or a public entity node 130B. A private entity node 130A or a public entity node 130B can be associated with the entity, and can host or provide an interface (e.g., a website, application, or API) such that the entity, via an entity client device 140 associated with the entity, can create, view, and/or verify stored datasets (i.e., datasets stored on the distributed ledger) in which the entity is referenced.

In some embodiments, the associated entity node 130A, 130B can provide the entity, via associated entity client device 140, a generated notification indicating that a dataset in which the entity is referenced is stored on the distributed ledger. The associated entity node 130A, 130B can receive a request, generated by and communicated from the associated entity client device 140, to verify the dataset based on the provided notification. Based on the received request, the associated entity node 130A, 130B can generate a digital certificate corresponding to the stored dataset and on behalf of the entity, whereby the generated digital certificate is issued from (i.e., on behalf of) the entity and to (i.e., naming as authorized recipient) the user associated with the stored dataset. Based on the digital certificate being generated, the associated entity node 130A, 130B can generate a transaction that includes the generated digital certificate, causing the nodes 120, 130A, 130B to store the generated digital certificate onto the distributed ledger. In some aspects, an entity can employ an associated entity client device 140 to create a dataset associated with a user without receiving a request, such that the dataset is generated and verified by the entity (e.g., a corresponding digital certificate is generated) via its associated entity client device 140 and entity node 130A, 130B. In accordance with some various embodiments described herein, a generated digital certificate issued from an entity or user can be interpreted as the generated digital certificate being issued on behalf of the entity or user. In other words, a node can generate the digital certificate naming the entity or user, or entity ID or user ID, as the issuer. On the other hand, a generated digital certificate that is issued to an entity or user can be interpreted as the generated digital certificate naming the entity or user, or entity ID or user ID, as a defined recipient. In some other embodiments, a generated digital certificate that is issued to an entity or user can be interpreted as the generated digital certificate being included in a generated transaction addressed from a first entity ID or first user ID (e.g., the issuer) to a second entity ID or second user ID, whereby the second entity ID or second user ID is the defined recipient.

In some embodiments, the public user node 120 can determine that the digital certificate, corresponding to a stored dataset, issued from an entity referenced in the stored dataset, and issued to the user associated with the stored dataset, is stored on the distributed ledger. Based on the determination, the public user node 120 can generate a notification for communication to the user client device 110 associated with the user, indicating that the stored dataset was verified by the referenced entity.

In some embodiments, the user can employ associated user client device 110 to generate a request to share a verified stored dataset (e.g., the stored dataset and/or the digital certificate issued by the previous employer), for communication to the public user node 120. The generated request to share the verified stored dataset can reference another entity (e.g., a potential employer). The public user node 120 can, based on receiving the request, generate another digital certificate for the verified stored dataset on behalf of the user, whereby the generated other digital certificate corresponds to the verified stored dataset (e.g., the stored dataset and/or the digital certificate issued by the previous employer), is issued from the user, and is issued to the other entity (e.g., the potential employer) referenced in the request to share the verified stored dataset.

In some embodiments, an entity node 130A, 130B associated with the referenced other entity (e.g., potential employer) can determine that the generated other digital certificate corresponding to the verified stored dataset (e.g., the stored dataset and/or the digital certificate issued by the previous employer), issued from the user, and issued to the different entity, is stored on the distributed ledger. Based on the determination, the associated entity node 130A, 130B can, among other things, communicate the stored other digital certificate or a generated notification corresponding thereto, to the entity client device 140 associated with the other entity, as an indication that the stored dataset referencing the other entity (e.g. previous employer) has been verified. In this way, another entity (e.g., potential employer) can determine that information (e.g., a profile dataset and/or claim) sent from a potential employee (e.g., user) is legitimate.

In various embodiments, it is contemplated that a user and/or entity can also be verified. In various aspects, a user or entity can employ an associated public user node 120 or entity node 130A, 130B, respectively, to generate an dataset that includes a claim of identity (e.g., that the entity is what it claims to be). In some embodiments, similar to those described above with regard to datasets including claims about a user's credentials, the user or entity can request that other users or entities verify a dataset, which includes a claim of the user or entity's identity. In this way, users and/or entities can verify each other's identities in a similar fashion. In some instances, a verified identity of a user and/or entity may be reflected in a digital certificate issued by the user and/or entity. In this regard, recipients of digital certificates issued by another user and/or entity can evaluate the reliability of a verifying source, based on whether or not the verifying party has been verified themselves.

By virtue of the foregoing information (e.g., datasets) being stored on a distributed ledger maintained by various embodiments of the described system 100, users and entities alike can share electronic information with one another, whereby the shared electronic information can be trusted, verified, immutable, and selectively shared, among other things.

Figure 2:
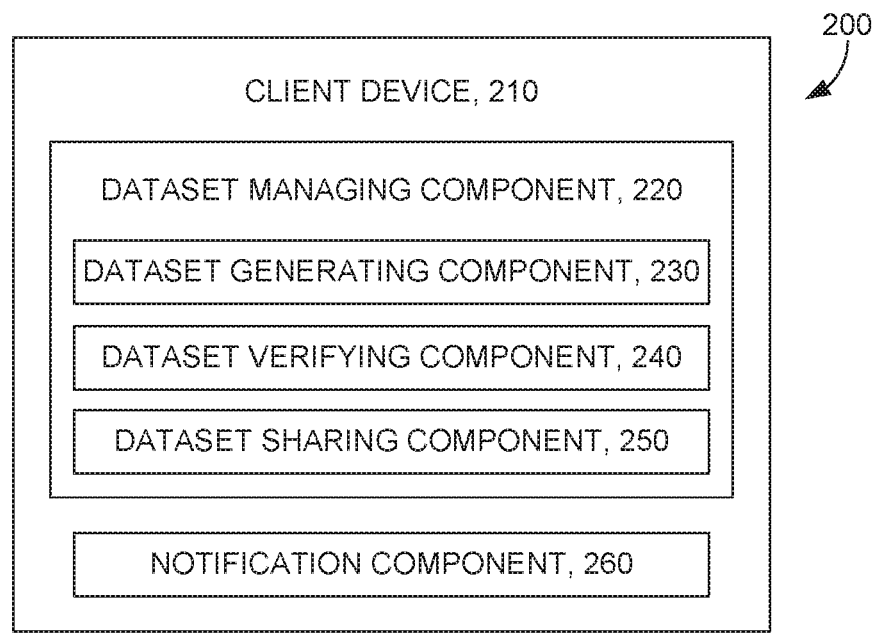
FIG. 2 is an exemplary client device in accordance with some embodiments of the present invention.

Looking now to FIG. 2, a block diagram 200 is provided depicting an exemplary client device 210, such as user client device 110 or entity client device 140 of FIG. 1, in accordance with some embodiments of the present disclosure. The client device 210 can be associated with a user or an entity, such that credentials (e.g., unique identifier, password) provided by the user or entity for employing aspects of the system, such as system 100 of FIG. 1, is provided by the client device 210 to an associated node. It is contemplated that in some embodiments, an entity need not be associated with a client device 210, such as entity client device 140 of FIG. 1, in order to interface with a private entity node 130A associated with the entity. It is contemplated that in such embodiments, the entity may interface directly with the private entity node 130A, such that aspects of the client device 210 described herein are provided on the associated private entity node 130A.

Limited to the description of FIG. 2, and for purposes of clarity in describing client device 210, a user or entity associated with client device 210 will be hereinafter referred to as an "end user," whereby the end user is associated with a unique identifier, such as a user ID or an entity ID, depending on the end user's role as a user or entity. References to an end user herein can be interpreted as an end user identifier ("end user ID"), such that a device or component associated with the end user can be associated with the end user ID associated with the end user.

In various embodiments, client device 210 can include a dataset managing component 220 that can provide for display, among other things, a graphical user interface (GUI) for interfacing with a node associated with the client device 210, such as public user node 120, private entity node 130A, or public entity node 130B of FIG. 1, and for managing datasets associated with an end user of the client device 210. In some embodiments, the displayed GUI can include one or more portions of a profile generated by or for the end user of the client device 210. In some aspects, each portion can correspond to a dataset associated with the end user and stored on the distributed ledger. In various embodiments, the GUI can enable the end user to, among other things, create, view, select, delete, modify, hide, or selectively share (e.g., provide or revoke access to) datasets associated with the end user, or in some further embodiments, associated with another end user, as will be described.

In some embodiments, dataset managing component 220 can include a dataset generating component 230 for enabling the generation of datasets associated with the end user. In some embodiments, a dataset can include, among other things, a claim about the end user and a reference to another end user that can verify the claim. In some other embodiments, a dataset can include, among other things, a claim about another end user and a reference to the verifying end user itself. Such embodiments would relate to scenarios where, by way of example, a previous employer can generate a dataset including a claim describing a previous employee's work history (e.g., time frame, title, scope of duties).

In various embodiments, a dataset can be a profile dataset, such as an end user's identity, contact information, demographic information, employment history, health history, criminal history, financial history, or educational background, among other things that can be included in a profile or presented on a profile webpage (e.g., such as a social media profile) associated with the end user.

In some embodiments, dataset generating component 230 can receive an input that includes a claim associated with the end user, and a reference to another end user that can verify the claim. The dataset generating component 230 can communicate the received input to a node associated with the client device 210, such as one of the nodes 120, 130A, 130B of FIG. 1, causing the associated node to generate a dataset associated with the end user. The associated node can generate the dataset based on the received input, and provide the dataset managing component 220 with the generated dataset for display via the GUI.

In some embodiments, dataset managing component 220 can include a dataset verifying component 240 for requesting verification of datasets, or verifying datasets referencing the end user of client device 210, among other things. In some aspects, dataset verifying component 240 can request that a generated dataset be verified by the referenced end user. The dataset verifying component 240 can receive, by way of a user input, a selection that corresponds to a displayed generated dataset. Based on the received selection, the dataset verifying component 240 can generate a request to submit for verification the displayed generated dataset corresponding to the selection (the "selected dataset") and communicate the generated request to the associated node, causing the associated node to generate a transaction that includes the selected dataset for communication to one or more nodes also maintaining the distributed ledger, such as any one of the nodes of system 100 of FIG. 1, so that the transaction can be validated and stored onto the distributed ledger.

In some further embodiments, dataset verifying component 240 can receive, from an associated node, a dataset that references the end user of client device 210. The dataset verifying component 240 can provide for display the received dataset, so that the end user of client device 210 can review (e.g., authenticate the veracity of) the received dataset for verification. The dataset verifying component 240 can further generate a verification command to verify the received dataset based on a received user input indicating an approval by the end user. In some aspects, the verification command can be generated automatically, particularly if the received dataset can be cross referenced against a set of data that is accessible to the dataset verifying component 240. Dataset verifying component 240 can then communicate the generated verification command to the associated node, causing the associated node to generate a digital certificate on behalf of the end user, whereby the generated digital certificate corresponds to the received dataset that was just verified. The generated digital certificate is issued from the end user referenced in the received dataset, and to the end user associated with the received dataset. In various embodiments, the generated digital certificate can include the received dataset or portions thereof (e.g., the claim), or can reference the transaction stored on the distributed ledger that includes or corresponds to the received dataset. The associated node can further generate a transaction that includes the generated digital certificate for communication to the one or more nodes also maintaining the distributed ledger, so that the transaction can be validated and stored onto the distributed ledger.

In some embodiments, dataset managing component 220 can employ both dataset generating component 230 and dataset verifying component 240 to generate a verified dataset for another end user, such as a dataset created by a previous employer for a previous employee, without having received a request to verify a generated dataset, by way of non-limiting example. In this regard, dataset generating component 230 can receive an input that includes a claim associated with the other end user, and a reference to the end user verifying the claim (i.e., the end user associated with client device 210). The dataset verifying component 240 can generate a verification command to verify the claim based on another received user input indicating an approval by the end user. Dataset verifying component 240 can then communicate both the claim and the generated verification command to the associated node, causing the associated node to generate a dataset and a digital certificate on behalf of the end user. The generated dataset can include the communicated claim, and the generated digital certificate can correspond to or include the generated dataset. The associated node can further generate a transaction that includes the generated digital certificate and/or the generated dataset for communication to the one or more nodes also maintaining the distributed ledger, so that the transaction can be validated and stored onto the distributed ledger.

In some embodiments, dataset managing component 220 can include a dataset sharing component 250 for requesting that one or more datasets associated with the end user be accessible to one or more designated end users. In some aspects, dataset sharing component 250 can request that a displayed generated dataset, whether verified or not, be accessible to another designated end user. The dataset sharing component 250 can receive, by way of a user input, a selection that corresponds to the displayed generated dataset (the "selected dataset"), and a designation of a recipient end user. Based on the received selection and designation, the dataset sharing component 250 can generate a request to share the selected dataset with the designated end user, and communicate the generated request to the associated node, causing the associated node to generate a digital certificate on behalf of the end user, whereby the generated digital certificate corresponds to the selected dataset. The generated digital certificate is issued from the end user associated with client device 210, and to the designated end user. In various embodiments, the generated digital certificate can include the selected dataset or portions thereof (e.g., the claim), or can reference the transaction stored on the distributed ledger that includes or corresponds to the selected dataset and/or the corresponding digital certificate issued by a verifying end user, if applicable. The associated node can further generate a transaction that includes the generated digital certificate for communication to the one or more nodes also maintaining the distributed ledger, so that the transaction can be validated and stored onto the distributed ledger.

In some further embodiments, the dataset sharing component 250 can modify a shared status of a dataset stored on the distributed ledger. The dataset sharing component 250 can receive, by way of a user input, a command to revoke access, and a selection that corresponds to a digital certificate, provided for display from an associated node and displayed by client device 210. The dataset sharing component 250 can communicate the command to revoke access and the selected digital certificate to the associated node, causing the associated node to generate a transaction that invalidates the selected digital certificate. In other words, the associated node can generate a transaction that includes a revocation certificate that corresponds to the selected digital certificate and/or the stored transaction including the selected digital certificate. The associated node can communicate the generated transaction to the one or more nodes also maintaining the distributed ledger, so that the transaction can be validated and stored onto the distributed ledger. In this way, a node associated with the other end user (i.e., the end user having access revoked) can determine that the distributed ledger includes the transaction including the revocation certificate, preventing access and viewability of the stored dataset thereto.

In some aspects, dataset managing component 220 can only view transactions or contents thereof that were generated and stored onto the distributed ledger based on actions taken by the client device 210. For instance, dataset managing component 220 can only view datasets associated with the end user of client device 210 and/or or digital certificates issued by or to the end user of client device 210. In some aspects, an associated node can limit the data communicated to the client device 210 based on the foregoing restrictions. As noted, an associated node can determine, based on transactions stored on the distributed ledger, whether a digital certificate is issued to an end user, from an end user, or whether the digital certificate has been revoked. In this way, the associated node can limit viewability of transactions and the content thereof to those having permission (e.g., by way of digital certificate) by the generating end user.

Figure 3:
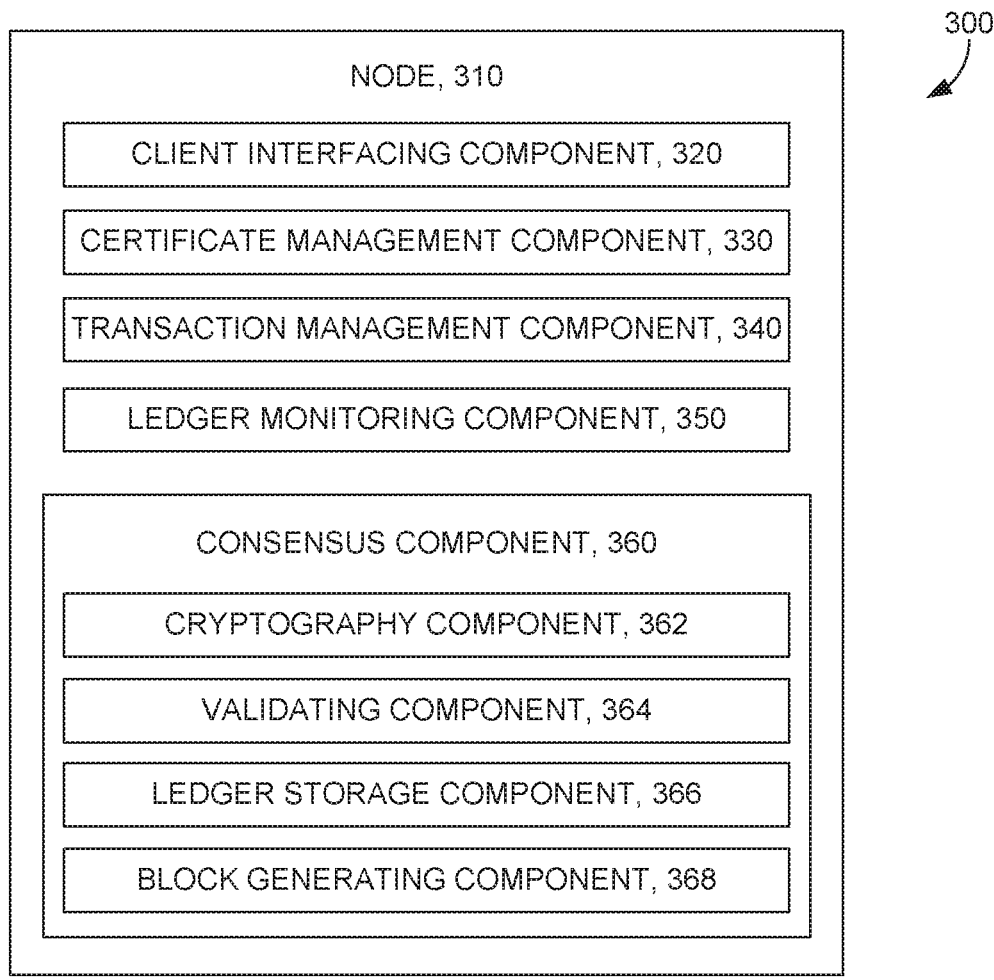
FIG. 3 is an exemplary node in accordance with some embodiments of the present invention.

Turning now to FIG. 3, a block diagram 300 is provided depicting an exemplary node 310, such as public user node 120, private entity node 130A, or public entity node 130B of FIG. 1, in accordance with some embodiments of the present disclosure. The node 310 can be associated with one or more users or entities, such that credentials (e.g., unique identifier, password) provided by each user or entity for employing aspects of the system, such as system 100 of FIG. 1, is provided to the node 310 from an associated client device, such as client device 210 of FIG. 2. On a high level, among other things, node 310 can generate datasets based on data provided thereto by a client device associated with a user or entity. The node 310 can generate transactions based on the provided data for storage of the generated datasets to a distributed ledger. The node 310 can facilitate verification of stored datasets by referenced end users, and further facilitate selective sharing of the stored datasets, among other things.

Limited to the description of FIG. 3, and for purposes of clarity in describing node 310, a user or entity associated with node 310 will be hereinafter referred to as an "end user," whereby the end user is associated with a unique identifier, such as a user ID or an entity ID, depending on the end user's role as a user or entity. References to an end user herein can be interpreted as an end user identifier ("end user ID"), such that a device or component associated with the end user can be associated with the end user ID associated with the end user.

In various embodiments, node 310 can include a client interfacing component 320 that can host an application service, such as a web host or API, to enable one or more client devices associated with end users to interact or exchange communications therewith. In some aspects, the node 310 can generate webpages dynamically based on data stored on the distributed ledger, of which node 310 locally stores a copy of and collectively maintains with other nodes of the system, such as system 100 of FIG. 1. The dynamically generated webpages can include various elements, such as datasets, digital certificates, GUI elements, and the like, which can be communicated to a client device associated with an end user. As described herein, in accordance with some embodiments, only the datasets generated by, and the digital certificates issued to or by, an end user can be provided for display to a client device associated with the end user based on credentials provided to the node 310 by the associated client device.

In various embodiments, client interfacing component 320 can generate, for an end user, a GUI that includes a listing of elements, including associated stored datasets, stored datasets that reference the end user, and/or digital certificates issued by or to the end user. Among other things, the GUI can facilitate input of data (e.g., claims, end user names or identifiers, profile data) and the selection of elements provided for display, so that various operations, such as generating, viewing, modifying, sharing, verifying, and the like, can be performed with the received data or selected elements.

In some embodiments, node 310 can include a certificate management component 330 for viewing, generating, or revoking digital certificates. In some embodiments, certificate management component 330 can generate digital certificates on behalf of an end user. Certificate management component 330 can receive, from a client device associated with an end user, a dataset or selected stored dataset, and a reference to another end user. Based on the receipt, the certificate management component 330 can generate a digital certificate that is issued from the associated end user, issued to the referenced other user, and corresponding to the received dataset or selected stored dataset. In this regard, certificate management component 330 can generate a transaction that includes the generated digital certificate, such that the generated transaction is communicated to one or more other nodes for validation and storage onto the distributed ledger.

In some embodiments, certificate management component 330 can generate revocation certificates on behalf of an end user. Certificate management component 330 can receive, from a client device associated with an end user, a selected digital certificate that is issued from the end user to another end user. Based on the receipt, the certificate management component 330 can generate a revocation certificate that corresponds to the dataset associated with the selected digital certificate. In this regard, certificate management component 330 can generate a transaction that includes the generated revocation certificate, such that the generated transaction is communicated to one or more other nodes for validation and storage onto the distributed ledger.

In some embodiments, certificate management component 330 can search the distributed ledger and parse valid digital certificates issued by or to an end user. Certificate management component 330 can, based on the parsed valid digital certificates, communicate the parsed valid digital certificates to the associated client device. In some instances, a GUI can be generated by certificate management component 330, including the parsed valid digital certificates, and the certificate management component 330 can communicate the generated GUI to the associated client device. In some aspects, the valid digital certificates can be sorted by one of the node 310 or the receiving associated client device, such that the end user can identify most recently-issued digital certificates issued to the end user. It is contemplated that a variety of display methods (e.g., pop up notifications, push messages, emails, SMS messages) can be employed to notify the end user of newly or recently-issued digital certificates, and such methods are considered within the purview of the present disclosure.

In some embodiments, node 310 can include a transaction management component 340 for viewing, generating, or modifying datasets associated with an end user. In some embodiments, transaction management component 340 can generate datasets associated with an end user based on dataset data (e.g., claim, reference to another end user) received from the associated client device. Transaction management component 340 can receive, from a client device associated with an end user, a dataset and a reference to another end user that can verify the dataset. Based on the received dataset and reference, the transaction management component 340 can generate a dataset associated with the end user. In some aspects, transaction management component 340 can generate a transaction that includes the generated dataset, such that the generated dataset is communicated to one or more other nodes for validation and storage onto the distributed ledger.

In some embodiments, transaction management component 340 can modify datasets associated an end user and stored on the distributed ledger. While the stored datasets themselves cannot be modified due to the immutable nature of the distributed ledger, a new, updated dataset can be generated based on changes corresponding to the stored dataset, received from the associated client device. In other words, transaction management component 340 can provide for display a stored dataset (e.g., in a list of stored datasets) communicated to the associated client device. The transaction management component 340 can receive a command to edit the stored dataset, and a GUI can be generated that populates an editable field with the stored dataset. In this way, the end user can provide edits to the populated field, so that the modified data (e.g., claim, referenced entity) therein can be submitted to the transaction management component 340, and a new dataset associated with the stored dataset can be generated. The transaction management component 340 can generate a new transaction that includes the modified data, such that the new transaction is communicated to one or more other nodes and stored to the distributed ledger. Based on the association between the original stored dataset and the modified stored dataset, the transaction management component 340 can determine which stored dataset is newer based on time or position within the distributed ledger, and provide the more recent, modified stored dataset in replacement of the originally stored dataset.

In some embodiments, transaction management component 340 can search the distributed ledger and parse stored datasets associated with the end user. A stored dataset associated with an end user can include stored datasets that were generated by the end user or include the end user as a reference for verifying the stored dataset. Transaction management component 340 can, based on the parsed stored datasets, communicate the parsed stored datasets to the associated client device. In some instances, a GUI can be generated by transaction management component 340, including the parsed stored datasets, and the GUI can be communicated from transaction management component 340 to the associated client device. In some aspects, the parsed stored datasets can be sorted by one of the node 310 or the receiving associated client device, such that the end user can identify most recently generated datasets associated with the end user. It is contemplated that a variety of display methods (e.g., pop up notifications, push messages, emails, SMS messages) can be employed to notify the end user of newly or recently-generated and stored datasets associated therewith, and such methods are considered within the purview of the present disclosure.

In various embodiments, transaction management component 340 can generate transactions that include generated datasets, generated digital certificates, references to other end users, and/or the end user associated with the client device. In various embodiments, transaction management component 340 can either digitally sign a generated transaction with a locally-stored private key associated with the end user, or can provide an interface that enables the end user to digitally-sign the transaction via the associated client device. In this way, transactions generated on behalf of an end user can be validated by other end users by employing a public key shared by the end user, for verifying the authenticity of the transaction and its associated end user.

In various embodiments, transaction management component 340 can communicate a generated transaction to one or more of the nodes, such as nodes 120, 130A, 130B of FIG. 1, collectively maintaining the distributed ledger with node 310. The nodes can collectively validate transactions, and store the transactions to a distributed ledger, a copy of which is locally stored in a memory of each of the nodes.

In some embodiments, node 310 can include a ledger monitoring component 350 that can monitor the distributed ledger, or validated transactions awaiting to be stored onto the distributed ledger, to determine whether an end user can be notified of an associated transaction, such as a stored dataset that references the end user, or a digital certificate issued to the end user, among other things. Ledger monitoring component 350 can monitor the contents of transactions added to the distributed ledger, or transactions that were recently validated by one or more of the nodes, to detect an associated transaction for notifying the end user. Based on the detected associated transaction, the ledger monitoring component 350 can generate a notification, such as generating a new GUI element, communicating a pop up notification, sending a push message, generating and sending an email to an email address associated with the end user, or sending a SMS message to a mobile number associated with the end user, among other notification techniques. In this way, the ledger monitoring component 350 can notify an end user when relevant activity may require the end user's attention, such as verifying a stored dataset or viewing a stored dataset.

In various embodiments, node 310 can include a consensus component 360 that facilitates, among other things, collective maintenance of the distributed ledger. The nodes 120, 130A, 130B, depicted in FIG. 1, includes a plurality of nodes that are each in communication with one or more of each other to provide a distributed ledger network. In some embodiments, and preferably for public blockchains, a type of distributed ledger, each of the nodes in the distributed ledger network can operate as a peer to every other node, such that no single node is more influential or powerful than any other node. Operations performed by nodes can include, among other things, validating transactions, verifying blocks of transactions, and adding records to an immutable distributed ledger that is collectively maintained by the nodes. It is contemplated, however, that in some embodiments, a particular subset of the nodes can be specifically designated for performing a subset of or all node operations described herein. In this regard, as opposed to embodiments where each node is a peer with other nodes, some embodiments can employ specially-"designated nodes" (preferably for private blockchains or ecosystems where centralization is not a concern) that perform a subset of or all of the described node operations.

In accordance with embodiments described herein, the distributed ledger includes a plurality of records that is immutable by virtue of the distributed nature of the distributed ledger network, applied cryptography concepts, and consensus component 360 that is independently included and operated by any number of nodes. While any node can generate a transaction to be added to the distributed ledger, the consensus module requires that the transaction be added to the distributed ledger only based on a determination that a consensus (e.g., greater than 50%) of the nodes (or designated nodes) has collectively validated the transaction. In this regard, while each node can independently store a copy of the distributed ledger, a transaction can only be added to the distributed ledger when a consensus to add the record has been determined reached by the nodes (or designated nodes) of the distributed ledger network. In accordance with various embodiments described herein, references to one or more nodes storing a transaction (e.g., a dataset, certificate, any other type of electronic data) to a distributed ledger can be interpreted as each of the one or more nodes storing the transaction to its own respective copy or instance of the distributed ledger, whereby the respective copy or instance is stored in a memory local to the node.

In various embodiments, validation of a transaction is facilitated utilizing aspects of asymmetric key cryptography (i.e., public-private key pairs), among other things. In some aspects, as is commonly known in public blockchains (e.g., Bitcoin), a private key can be employed to generate one or more associated public keys, encrypt data that can only be decrypted by an associated public key, and/or digitally sign data or transactions. On the other hand, a public key can be employed to decrypt data encrypted by an associated private key, encrypt data that only the private key can decrypt, and/or digitally authenticate a digital signature generated by an associated private key. As public keys can be shared freely, public keys generally function as "wallet addresses" that are associated with a private key. In this regard, datasets can be "transmitted" from one wallet address (i.e., a public key of a sender) to another wallet address (i.e., a public key of a receiver). In actuality, however, the transmission of a dataset is not a physical transfer, but is represented as a record of transfer from one wallet address to another that, if validated, is recorded onto the distributed ledger. The transaction is not finalized (i.e., added to the distributed ledger), however, until the transfer is validated by a consensus of the nodes.

To generate a transaction including a dataset or digital certificate, the end user of the sending wallet address must digitally sign the transaction with the private key associated with the sending wallet address. The nodes (or designated nodes) of the distributed ledger network must independently determine that the transaction from the sending wallet address is valid by digitally authenticating the digital signature with the sending wallet address (i.e., the public key). The nodes (or designated nodes) must also independently determine, by referencing their independently-stored copy of the distributed ledger, that the sending wallet address is in fact associated with the dataset or digital certificate being transferred, or in some aspects, that the sending wallet has authorization or a privilege to do so. If a node (or designated node) in the distributed ledger network determines that either of the foregoing conditions is not satisfied, the transaction is determined invalid by the node and the transaction is not passed on (e.g., communicated) to other nodes (or designated nodes) to which it is connected. On the other hand, if the node (or designated node) determines that both of the foregoing conditions are satisfied, the transaction is determined valid and the node passes on (e.g., communicates) the transaction, along with an indication that the node independently validated the transaction, to other nodes (or designated nodes) to which it is connected. As the nodes in the distributed ledger network are all directly or indirectly connected to one another, this validation process continues until the nodes (or designated nodes) collectively determine that a majority (i.e., consensus) has validated the transaction. The collective determination of consensus can be facilitated by virtue of each node (or designated node) maintaining a list of other nodes (or designated nodes) on the network (e.g., by I.P. address or other identifier) along with their respective determinations of transaction validity.

After a consensus of validity for a transaction has been reached by the nodes (or designated nodes), the transaction awaits confirmation (i.e., addition to the distributed ledger). As the nodes (or designated nodes) can be peers with each other, any node (or designated node) can participate in the process of adding the transaction to the distributed ledger. For purposes of background, the distributed ledger includes validated transactions that are grouped into a cryptographically chained series of blocks, whereby each block includes a subset of these validated transactions. Any node (or designated node) can perform the process of block generation, which can be implemented in a variety of ways based on a consensus algorithm implemented within its consensus module including, but not limited to, proof of work, proof of stake, proof of authority, practical Byzantine Fault Tolerance, or Federated Byzantine Agreements. As the aforementioned processes for block generation are generally known in the art, additional detail for these processes are not described herein. It is contemplated, however, that any implementation of block generation and consensus determination can be employed in accordance with the present disclosure. More importantly, as the general outcome of block generation is relatively similar among these implementations, the following description is provided irrespective of the block generation aspect of the consensus module.

To add a validated transaction to the distributed ledger, the transaction must first be included into a block that is being generated by one of the nodes (or designated nodes) and subsequently validated by a consensus of the nodes (or designated nodes) in the distributed ledger network. The transaction can be independently included into a block, or grouped together with other transactions, either of which are included within the purview of the present disclosure. Such implementations may vary, however, based on defined consensus rules and/or a block size (i.e., memory limitation) implemented or defined within in the consensus component 360 operated by the nodes (or designated nodes). The node generating the block must also include, into the block it is generating, a cryptographic hash of the block most-recently added to the distributed ledger. Once generated in accordance with consensus rules defined within the consensus component 360, the node generating the block can send the generated block to the nodes (or designated nodes) to which it is connected.

The nodes (or designated nodes) receiving the generated block can then verify that the block includes one or more valid transactions, includes a hash value of the block most-recently added to the distributed ledger, and was generated in accordance with the defined consensus rules. Upon verifying the foregoing, the nodes (or designated nodes) can pass on (e.g., communicate) the verified block to its neighboring nodes (or neighboring designated nodes). In this way, similar to how a transaction is validated by a determined consensus of the distributed ledger network, the generated block including at least the transaction can be verified by another determined consensus of the nodes (or designated nodes). When a determination is made by a consensus of the nodes (or designated nodes) that a block is verified, the newly-verified block is added to the distributed ledger immediately subsequent to the previously-added block, the hash of the previously-added block being included in the newly-verified block. As such, each block is cryptographically "chained" to a previous block and a subsequent block. In other words, the cryptographic hashes facilitate maintenance of the order and accuracy of records included in the distributed ledger.

In some instances, if the same transaction is included into a block generated by different nodes (or designated nodes) and validated throughout the network within a substantially similar timeframe, the blocks can be temporarily confirmed leading up to a temporary fork in the distributed ledger (e.g., two potential branches stemming from the main chain). The forked chain can be maintained by the nodes (or designated nodes) until a determination is made, by a consensus of the distributed ledger network, that one of the forks has a larger quantity of blocks than the other. Based on a subsequent determination that one of the forks is shorter than the other, the nodes (or designated nodes) can prune (e.g., delete) the shorter chain, and maintain the longer chain as the determinative fork of the distributed ledger.

Provided the foregoing, the consensus component 360 can include cryptography component 362, which can employ asymmetric cryptography (i.e., public-private key) to perform digital authentication and/or verification operations. By way of example, cryptography component 362 can determine whether a transaction submitted from a public key is digitally signed with a corresponding private key. As a digital signature from a public key can only be valid if digitally signed with the corresponding private key, the cryptography component 362 can be employed by the validating component 364 to verify that the transaction is valid with regards to the sender of the transaction. Without going into further detail, in further embodiments, the cryptography component 362 can further generate hashes of data, such as transactions, transaction blocks, or passwords, among other things. Hashes can be employed by the validating component 364 to determine that the data has not been altered from a prior state, based on a comparison of any generated hash(es) of the data in a current state to any generated hash(es) of data in the prior state.

The ledger storage component 366 can interface with a memory (not shown) of the node 310, and can include any type of memory, such as a hardware storage device, random access memory (RAM), a cache, read-only memory (ROM), and the like, including any combination thereof. The memory can be employed to store data communicated from other the nodes, associated client devices, or other computing devices. The communicated data stored in memory can include, among other things, transactions, one or more blocks of a distributed ledger, determinations of validity, determinations of authentication/verification, unique identifiers and/or IP addresses of one or more of the nodes, and other types of electronic data not limited to the foregoing. In various embodiments, the ledger storage component 366 can receive and maintain communications and transactions from client devices, such as client device 210 of FIG. 1, and other nodes of the distributed ledger network. In various embodiments, the ledger storage component 366 can store a copy of the distributed ledger.

In various embodiments, block generating component 368 can generate blocks of transactions that have been validated by all nodes of the distributed ledger network. In some embodiments, a block can be generated by a node if a correct "nonce" is guessed for a set of validated transactions selected by the node for inclusion into a block. This particular process is also called "mining," and is common to proof-of-work-based consensus algorithms. In some other embodiments, a block can be generated by a node if a group of designated nodes are programmed under a Federated Byzantine Agreement, which defines the group of designated nodes as being those that are authorized to generate new blocks. It is contemplated that any technique for block generation by the nodes is within the purview of the present disclosure, and the process of generating blocks is not necessarily limited to one consensus methodology known to one of ordinary skill.

Figure 4:
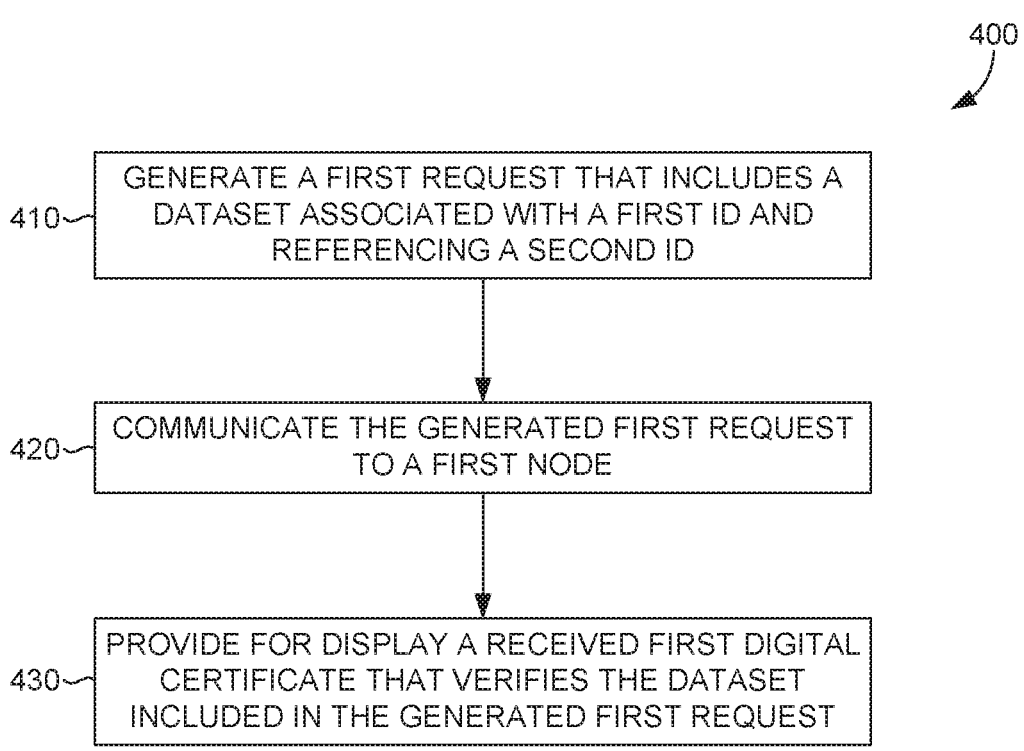
FIG. 4 is a flow diagram showing a method for verifying profile datasets in accordance with some embodiments of the present invention.

Turning now to FIG. 4, a flow diagram 400 is provided that illustrates a method for verifying profile datasets in accordance with some embodiments of the present disclosure. At step 410, a client device associated with a user ID, such as user client device 110 of FIG. 1, can generate a first request that corresponds to a dataset associated with a user ID. The dataset can include, among other things, a claim (e.g., a fact or assertion) and a reference to an entity ID. The dataset can be included in the first request or referenced in the first request. For instance, the first request can reference the dataset if the dataset is selected from a list of datasets previously provided by the client device. In various embodiments, the first request can be a request that the dataset to be verified (e.g., by an entity associated with the referenced entity ID).

The client device, at step 420, can communicate the generated first request to a node, such as public user node 120 of FIG. 1, associated with the user ID of the client device. The node is one of a plurality of nodes configured to collectively maintain a distributed ledger, such as a blockchain, by way of example. In various embodiments, the plurality of nodes is configured to both independently and collectively store datasets, digital certificates, or transactions including datasets or digital certificates, among other things, to the distributed ledger. The node can, based on the communicated first request, generate a transaction having the dataset of the first request included therein, and communicate the generated transaction to any node of the plurality of nodes. Any node receiving the transaction can forward the communicated transaction to another node of the plurality of nodes, until the plurality of nodes collectively determine that a consensus of the nodes has received the communicated transaction and determined that the communicated transaction should be added to the distributed ledger. In this regard, the plurality of nodes can store the communicated transaction (i.e., the dataset included in the communicated transaction) on the distributed ledger. In accordance with the present disclosure, references to the plurality of nodes storing a transaction on the distributed ledger can be interpreted as each node storing the communicated transaction on its respective copy of the distributed ledger.

In various embodiments, another node, such as one of private entity node 130A or public entity node 130B of FIG. 1, can generate a first digital certificate based on a command received from another client device associated with the referenced entity ID, such as entity client device 140 of FIG. 1. The command can correspond to (e.g., reference, include) the stored dataset and, based on receiving the command, the other node (e.g., entity node 130A, 130B) can generate a first digital certificate that is issued from the referenced entity ID and to the user ID. In some aspects, the generated first digital certificate can correspond to (e.g., reference, include) the stored dataset. The other node (e.g., entity node 130A, 130B) can be associated with the referenced entity ID.

The other node (e.g., entity node 130A, 130B) can also generate a transaction including the generated first digital certificate. The other node can communicate the generated transaction to any node of the plurality of nodes. Any node receiving the transaction can forward the communicated transaction to another node of the plurality of nodes, until the plurality of nodes collectively determine that a consensus of the nodes has received the communicated transaction and agree that the communicated transaction should be added to the distributed ledger. In this regard, the plurality of nodes can store the communicated transaction (i.e., the first digital certificate included in the communicated transaction) on the distributed ledger.

The node (e.g., public user node 120) can determine that the stored first digital certificate is issued to the user ID. Based on the determination, the node can communicate the stored first digital certificate to the client device (e.g., client device 110) associated with the user ID. In some aspects, the node can generate a graphical user interface (GUI), such a website, that includes the stored first digital certificate, which can be represented in various ways, such as text, an image, a GUI element, an indicator, or a combination thereof. In this regard, the node can communicate the GUI including the stored first digital certificate to the client device based on the determination that the stored first digital certificate is issued to the user ID.

At step 430, the client device (e.g., client device 110) can receive the stored first digital certificate communicated from the node (e.g., public user node 120). Based on receiving the communicated first digital certificate, the client device can provide for display the received first digital certificate as an indication that the stored dataset has been verified by the entity ID referenced therein.

In some further embodiments, the client device can generate a second request that corresponds to (e.g., references, includes) the received first digital certificate and references another entity ID. The client device can communicate the generated second request to the node (e.g., public user node 120). In various embodiments, the second request can be a request that the verified dataset be shared with or visible to the other referenced entity ID (e.g., another entity or client device associated with the other referenced entity ID). The node can generate, based on receiving the communicated second request, a second digital certificate that corresponds to (e.g., references, includes) the stored first digital certificate. The generated second digital certificate can be issued to the referenced other entity ID and from the user ID.

The node can, based on the generation of the second digital certificate, generate a transaction having the generated second digital certificate included therein, and communicate the generated transaction to any node of the plurality of nodes. Any node receiving the transaction can forward the communicated transaction to another node of the plurality of nodes, until the plurality of nodes collectively determine that a consensus of the nodes has received the communicated transaction and determined that the communicated transaction should be added to the distributed ledger. In this regard, the plurality of nodes can store the communicated transaction (i.e., the second digital certificate included in the communicated transaction) on the distributed ledger.

In various embodiments, another node, such as one of private entity node 130A or public entity node 130B of FIG. 1, associated with the other referenced ID can determine that the stored second digital certificate is issued to the other referenced ID. Based on the determination, the associated entity node (e.g., the entity node associated with the other referenced ID) can communicate the stored second digital certificate to a different client device associated with the other referenced ID, such as entity client device 140 of FIG. 1. In some aspects, the associated entity node can generate a graphical user interface (GUI), such a website, that includes the stored second digital certificate, which can be represented in various ways, such as text, an image, a GUI element, an indicator, or a combination thereof. In this regard, the associated entity node can communicate the GUI including the stored second digital certificate to the different client device based on the determination that the stored second digital certificate is issued to the other referenced ID.

The different client device (e.g., entity client device 140) can receive the stored second digital certificate communicated from associated entity node (e.g., the entity node associated with the other referenced ID). Based on receiving the communicated second digital certificate, the different client device can provide for display the received second digital certificate as an indication that the stored dataset has been verified by the entity ID referenced therein.

Figure 5:
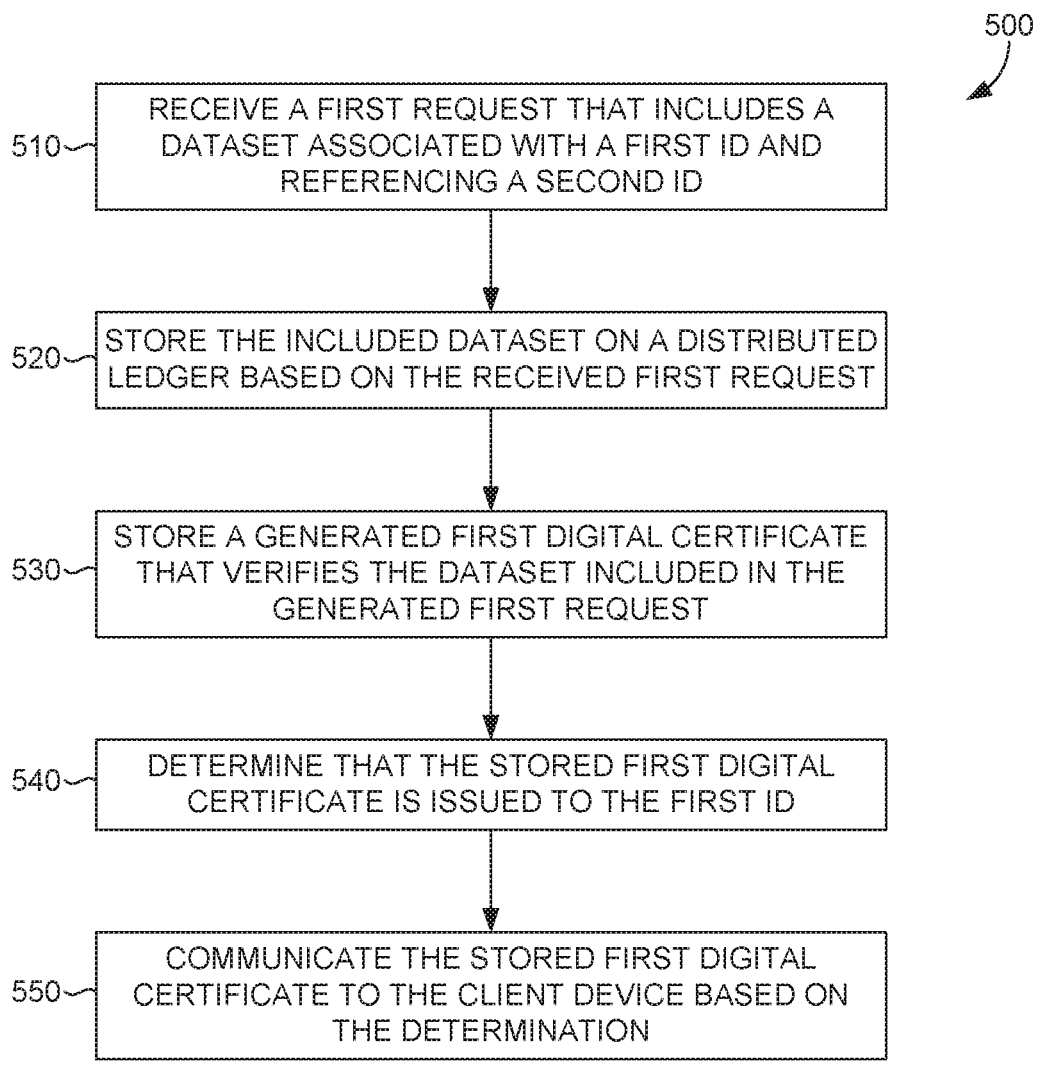
FIG. 5 is a flow diagram showing another method for verifying profile datasets in accordance with some embodiments of the present invention.

Turning now to FIG. 5, a flow diagram 500 is provided that illustrates a method for verifying profile datasets in accordance with some embodiments of the present disclosure. As described with respect to flow diagram 400 of FIG. 4, a client device associated with a user ID, such as user client device 110 of FIG. 1, can generate a first request that corresponds to a dataset associated with a user ID. The dataset can include, among other things, a claim (e.g., a fact or assertion) and a reference to an entity ID. The dataset can be included in the first request or referenced in the first request. For instance, the first request can reference the dataset if the dataset is selected from a list of datasets previously provided by the client device. In various embodiments, the first request can be a request that the dataset to be verified (e.g., by an entity associated with the referenced entity ID).

At step 510, a node, such as public user node 120 of FIG. 1, associated with the user ID of the client device can receive the generated first request communicated from the client device. The node is one of a plurality of nodes configured to collectively maintain a distributed ledger, such as a blockchain, by way of example. In various embodiments, the plurality of nodes is configured to both independently and collectively store datasets, digital certificates, or transactions including datasets or digital certificates, among other things, to the distributed ledger. The node can, based on the received first request, generate a transaction having the dataset of the first request included therein, and communicate the generated transaction to any node of the plurality of nodes. Any node receiving the transaction can forward the communicated transaction to another node of the plurality of nodes, until the plurality of nodes collectively determine that a consensus of the nodes has received the communicated transaction and determined that the communicated transaction should be added to the distributed ledger. In this regard, the plurality of nodes can store the communicated transaction (i.e., the dataset included in the communicated transaction) on the distributed ledger. In accordance with the present disclosure, references to the plurality of nodes storing a transaction on the distributed ledger can be interpreted as each node storing the communicated transaction on its respective copy of the distributed ledger.

In various embodiments, another node, such as one of private entity node 130A or public entity node 130B of FIG. 1, can generate a first digital certificate based on a command received from another client device associated with the referenced entity ID, such as entity client device 140 of FIG. 1. The command can correspond to (e.g., reference, include) the stored dataset and, based on receiving the command, the other node (e.g., entity node 130A, 130B) can generate a first digital certificate that is issued from the referenced entity ID and to the user ID. In some aspects, the generated first digital certificate can correspond to (e.g., reference, include) the stored dataset. The other node (e.g., entity node 130A, 130B) can be associated with the referenced entity ID.

The other node (e.g., entity node 130A, 130B) can also generate a transaction including the generated first digital certificate. The other node can communicate the generated transaction to any node of the plurality of nodes. Any node receiving the transaction can forward the communicated transaction to another node of the plurality of nodes, until the plurality of nodes collectively determine that a consensus of the nodes has received the communicated transaction and agree that the communicated transaction should be added to the distributed ledger. In this regard, the plurality of nodes can store the communicated transaction (i.e., the first digital certificate included in the communicated transaction) on the distributed ledger.

At step 520, the node (e.g., public user node 120) can determine that the stored first digital certificate is issued to the user ID associated with the node. Based on the determination, the node can, at step 530, communicate the stored first digital certificate to the client device (e.g., client device 110) associated with the user ID. In some aspects, the node can generate a graphical user interface (GUI), such a website, that includes the stored first digital certificate, which can be represented in various ways, such as text, an image, a GUI element, an indicator, or a combination thereof. In this regard, the node can communicate the GUI including the stored first digital certificate to the client device based on the determination that the stored first digital certificate is issued to the user ID.

The client device (e.g., client device 110) can receive the stored first digital certificate communicated from the node (e.g., public user node 120). Based on receiving the communicated first digital certificate, the client device can provide for display the received first digital certificate as an indication that the stored dataset has been verified by the entity ID referenced therein.

In some further embodiments, the client device can generate a second request that corresponds to (e.g., references, includes) the received first digital certificate and references another entity ID. The client device can communicate the generated second request to the node (e.g., public user node 120). In various embodiments, the second request can be a request that the verified dataset be shared with or visible to the other referenced entity ID (e.g., another entity or client device associated with the other referenced entity ID). The node can generate, based on receiving the communicated second request, a second digital certificate that corresponds to (e.g., references, includes) the stored first digital certificate. The generated second digital certificate can be issued to the referenced other entity ID and from the user ID.

The node can, based on the generation of the second digital certificate, generate a transaction having the generated second digital certificate included therein, and communicate the generated transaction to any node of the plurality of nodes. Any node receiving the transaction can forward the communicated transaction to another node of the plurality of nodes, until the plurality of nodes collectively determine that a consensus of the nodes has received the communicated transaction and determined that the communicated transaction should be added to the distributed ledger. In this regard, the plurality of nodes can store the communicated transaction (i.e., the second digital certificate included in the communicated transaction) on the distributed ledger.

In various embodiments, another node, such as one of private entity node 130A or public entity node 130B of FIG. 1, associated with the other referenced ID can determine that the stored second digital certificate is issued to the other referenced ID. Based on the determination, the associated entity node (e.g., the entity node associated with the other referenced ID) can communicate the stored second digital certificate to a different client device associated with the other referenced ID, such as entity client device 140 of FIG. 1. In some aspects, the associated entity node can generate a graphical user interface (GUI), such a website, that includes the stored second digital certificate, which can be represented in various ways, such as text, an image, a GUI element, an indicator, or a combination thereof. In this regard, the associated entity node can communicate the GUI including the stored second digital certificate to the different client device based on the determination that the stored second digital certificate is issued to the other referenced ID.

The different client device (e.g., entity client device 140) can receive the stored second digital certificate communicated from associated entity node (e.g., the entity node associated with the other referenced ID). Based on receiving the communicated second digital certificate, the different client device can provide for display the received second digital certificate as an indication that the stored dataset has been verified by the entity ID referenced therein.

Figure 6:
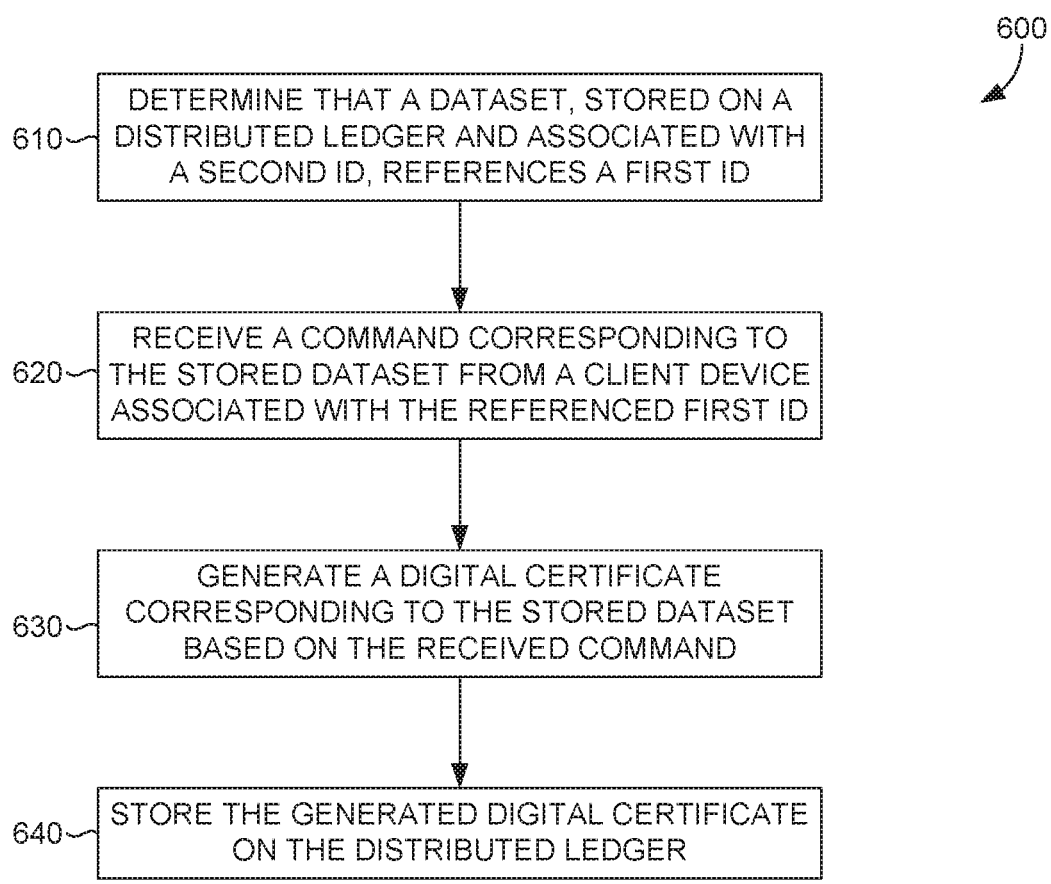
FIG. 6 is a flow diagram showing another method for verifying profile datasets in accordance with some embodiments of the present invention.

Turning now to FIG. 6, a flow diagram is provided that illustrates a method for verifying profile datasets in accordance with some embodiments of the present disclosure. As described with respect to flow diagrams 400, 500 of FIGS. 4 & 5, respectively, a client device associated with a user ID, such as user client device 110 of FIG. 1, can generate a first request that corresponds to a dataset associated with a user ID. The dataset can include, among other things, a claim (e.g., a fact or assertion) and a reference to an entity ID. The dataset can be included in the first request or referenced in the first request. For instance, the first request can reference the dataset if the dataset is selected from a list of datasets previously provided by the client device. In various embodiments, the first request can be a request that the dataset to be verified (e.g., by an entity associated with the referenced entity ID).

A node, such as public user node 120 of FIG. 1, associated with the user ID of the client device can receive the generated first request communicated from the client device. The node is one of a plurality of nodes configured to collectively maintain a distributed ledger, such as a blockchain, by way of example. In various embodiments, the plurality of nodes is configured to both independently and collectively store datasets, digital certificates, or transactions including datasets or digital certificates, among other things, to the distributed ledger. The node can, based on the received first request, generate a transaction having the dataset of the first request included therein, and communicate the generated transaction to any node of the plurality of nodes. Any node receiving the transaction can forward the communicated transaction to another node of the plurality of nodes, until the plurality of nodes collectively determine that a consensus of the nodes has received the communicated transaction and determined that the communicated transaction should be added to the distributed ledger. In this regard, the plurality of nodes can store the communicated transaction (i.e., the dataset included in the communicated transaction) on the distributed ledger. In accordance with the present disclosure, references to the plurality of nodes storing a transaction on the distributed ledger can be interpreted as each node storing the communicated transaction on its respective copy of the distributed ledger.

At step 610, another node, such as one of private entity node 130A or public entity node 130B of FIG. 1, can determine that the stored transaction includes the dataset, and that the dataset references an entity ID. Based on the determination, the other node can, at step 620, receive a command from another client device associated with the referenced entity ID, such as entity client device 140 of FIG. 1. The command can correspond to (e.g., reference, include) the stored dataset and, based on receiving the command, the other node (e.g., entity node 130A, 130B) can, at step 630, generate a first digital certificate that is issued from the referenced entity ID and to the user ID. In some aspects, the generated first digital certificate can correspond to (e.g., reference, include) the stored dataset. The other node (e.g., entity node 130A, 130B) can be associated with the referenced entity ID.

The other node (e.g., entity node 130A, 130B) can also generate a transaction including the generated first digital certificate. The other node can communicate the generated transaction to any node of the plurality of nodes. Any node receiving the transaction can forward the communicated transaction to another node of the plurality of nodes, until the plurality of nodes collectively determine that a consensus of the nodes has received the communicated transaction and agree that the communicated transaction should be added to the distributed ledger. In this regard, the plurality of nodes can store the communicated transaction (i.e., the first digital certificate included in the communicated transaction) on the distributed ledger.

The node (e.g., public user node 120) can determine that the stored first digital certificate is issued to the user ID associated with the node. Based on the determination, the node can communicate the stored first digital certificate to the client device (e.g., client device 110) associated with the user ID. In some aspects, the node can generate a graphical user interface (GUI), such a website, that includes the stored first digital certificate, which can be represented in various ways, such as text, an image, a GUI element, an indicator, or a combination thereof. In this regard, the node can communicate the GUI including the stored first digital certificate to the client device based on the determination that the stored first digital certificate is issued to the user ID.

The client device (e.g., client device 110) can receive the stored first digital certificate communicated from the node (e.g., public user node 120). Based on receiving the communicated first digital certificate, the client device can provide for display the received first digital certificate as an indication that the stored dataset has been verified by the entity ID referenced therein.

In some further embodiments, the client device can generate a second request that corresponds to (e.g., references, includes) the received first digital certificate and references another entity ID. The client device can communicate the generated second request to the node (e.g., public user node 120). In various embodiments, the second request can be a request that the verified dataset be shared with or visible to the other referenced entity ID (e.g., another entity or client device associated with the other referenced entity ID). The node can generate, based on receiving the communicated second request, a second digital certificate that corresponds to (e.g., references, includes) the stored first digital certificate. The generated second digital certificate can be issued to the referenced other entity ID and from the user ID.

The node can, based on the generation of the second digital certificate, generate a transaction having the generated second digital certificate included therein, and communicate the generated transaction to any node of the plurality of nodes. Any node receiving the transaction can forward the communicated transaction to another node of the plurality of nodes, until the plurality of nodes collectively determine that a consensus of the nodes has received the communicated transaction and determined that the communicated transaction should be added to the distributed ledger. In this regard, the plurality of nodes can store the communicated transaction (i.e., the second digital certificate included in the communicated transaction) on the distributed ledger.

In various embodiments, another node, such as one of private entity node 130A or public entity node 130B of FIG. 1, associated with the other referenced ID can determine that the stored second digital certificate is issued to the other referenced ID. Based on the determination, the associated entity node (e.g., the entity node associated with the other referenced ID) can communicate the stored second digital certificate to a different client device associated with the other referenced ID, such as entity client device 140 of FIG. 1. In some aspects, the associated entity node can generate a graphical user interface (GUI), such a website, that includes the stored second digital certificate, which can be represented in various ways, such as text, an image, a GUI element, an indicator, or a combination thereof. In this regard, the associated entity node can communicate the GUI including the stored second digital certificate to the different client device based on the determination that the stored second digital certificate is issued to the other referenced ID.

The different client device (e.g., entity client device 140) can receive the stored second digital certificate communicated from associated entity node (e.g., the entity node associated with the other referenced ID). Based on receiving the communicated second digital certificate, the different client device can provide for display the received second digital certificate as an indication that the stored dataset has been verified by the entity ID referenced therein.

Figure 7:
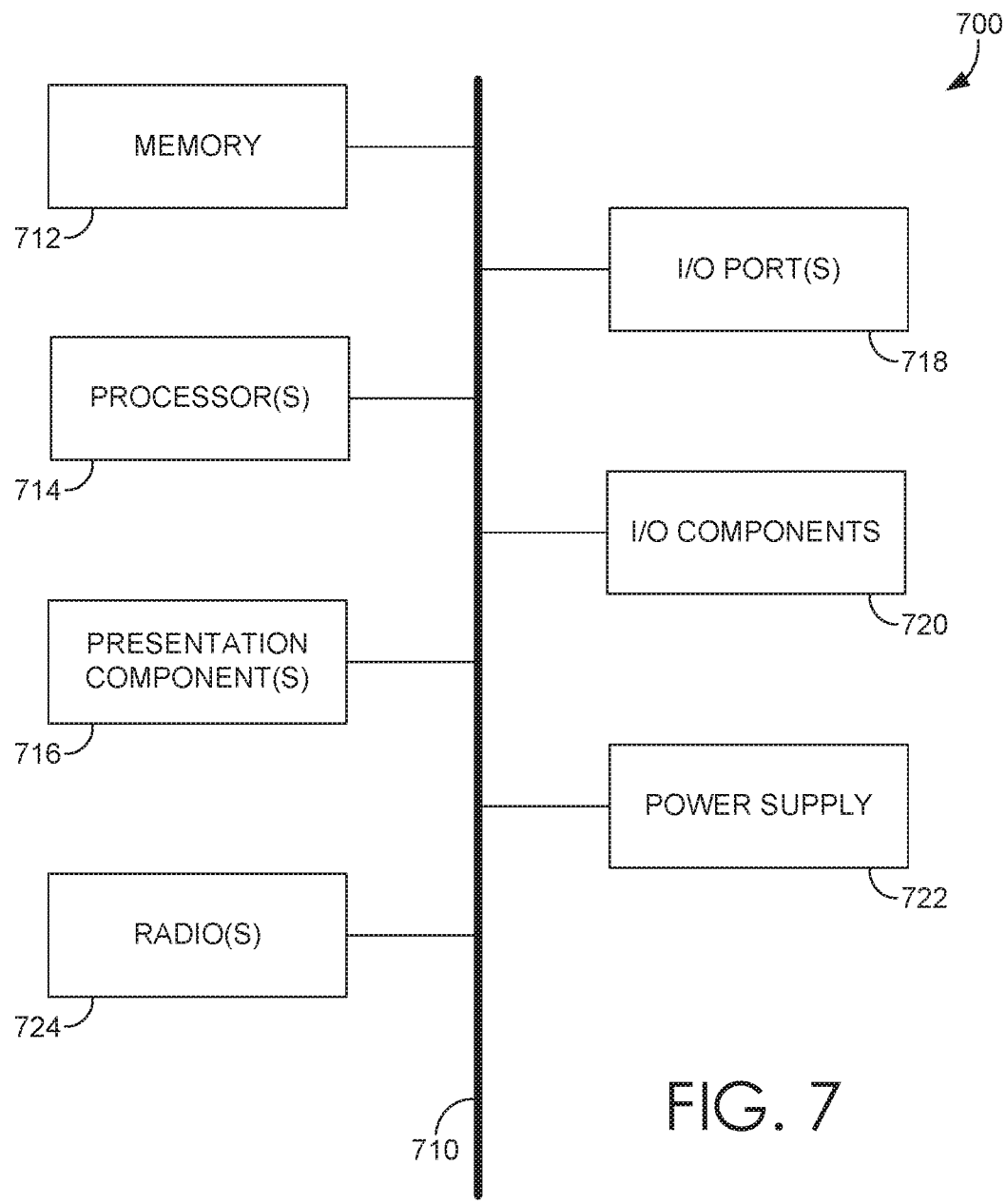
FIG. 7 is a block diagram of an exemplary computing environment suitable for use in implementing some embodiments of the present invention.

Having described embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, embodiments of the present invention provide for, among other things, verifying and selectively sharing verified profile datasets utilizing aspects of distributed ledger technologies. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for verifying profile datasets, the method comprising:
    generating, by a client device associated with a first identifier (ID), a first request for verifying a dataset included in the first request, the dataset being associated with the first ID and referencing a second ID;
    communicating, by the client device, the generated first request to a first node, the first node being one of a plurality of nodes configured to store the included dataset on a distributed ledger based on the communicated first request,
    wherein a second node of the plurality of nodes is configured to generate a first digital certificate corresponding to the stored dataset and issued to the first ID based on a command received from another client device associated with the referenced second ID;
    receiving, by the client device, the generated first digital certificate from the first node based on a determination that the generated first digital certificate is stored on the distributed ledger and is issued to the first ID; and
    providing for display, by the client device, the received first digital certificate as an indication that the dataset was verified by the referenced second ID.

2. The computer-implemented method of claim 1, wherein the generated first digital certificate includes the dataset.

3. The computer-implemented method of claim 1, wherein the generated first digital certificate is issued from the referenced second ID.

4. The computer-implemented method of claim 1, wherein the another client device associated with the referenced second ID is configured to send the command to the second node based on a received input.

5. The computer-implemented method of claim 1, further comprising:
    communicating, by the client device, a generated second request to the first node, the generated second request corresponding to the stored first digital certificate and referencing a third ID, wherein the first node is further configured to generate a second digital certificate corresponding to the stored first digital certificate based on the communicated second request, the generated second digital certificate being issued to the referenced third ID from the first ID.

6. The computer-implemented method of claim 5, wherein the second node or a third node of the plurality of nodes is configured to communicate, to a different client device associated with the referenced third ID, the generated second digital certificate based on a determination that the generated second digital certificate is stored on the distributed ledger and is issued to the referenced third ID.

7. The computer-implemented method of claim 6, wherein the different client device is configured to provide for display the communicated second digital certificate as another indication that the dataset was verified by the second ID.

8. The computer-implemented method of claim 1, wherein the first digital certificate is received as a graphical user interface element for presentation via a user interface.

9. A system comprising:
a first node having one or more processors and one or more computer storage media storing computer-usable instructions that, when used by the one or more processors, cause the one or more processors to:
receive a first request from a client device associated with a first identifier (ID), the received first request requesting for verifying a dataset included in the first request, the dataset being associated with the first ID and referencing a second ID,
store the included dataset on a distributed ledger based on the received first request, wherein the first node is one of a plurality of nodes configured to store the included dataset on the distributed ledger based on the received first request,
wherein a second node of the plurality of nodes is configured to generate a first digital certificate corresponding to the stored dataset and issued to the first ID based on a command received from another client device associated with the referenced second ID,
store the first digital certificate on the distributed ledger based on the generation thereof, wherein the first node is one of the plurality of nodes further configured to store the first digital certificate on the distributed ledger based on the generation thereof,
determine that the stored first digital certificate is issued to the first ID; and
communicate the stored first digital certificate to the client device based on the determination,
wherein the client device is configured to provide for display the communicated first digital certificate as an indication that the stored dataset was verified by the referenced second ID.

10. The system of claim 9, wherein the generated first digital certificate includes the stored dataset.

11. The system of claim 10, wherein the generated first digital certificate is issued from the referenced second ID.

12. The system of claim 9, wherein the second node is configured to receive the command from the another client device associated with the referenced second ID.

13. The system of claim 9, wherein the one or more computer storage media stores the computer-usable instructions that, when used by the one or more processors, further cause the one or more processors to:

receive a second request from the client device, the received second request corresponding to the stored first digital certificate and referencing a third ID; and
based on the received second request, generate a second digital certificate that corresponds to the stored first digital certificate, the generated second digital certificate being issued to the referenced third ID from the first ID.

14. The system of claim 13, wherein the one or more computer storage media stores the computer-usable instructions that, when used by the one or more processors, further cause the one or more processors to:
store the second digital certificate on the distributed ledger based on the generation thereof, wherein the first node is one of the plurality of nodes further configured to store the second digital certificate on the distributed ledger based on the generation thereof,
wherein one of the second node or a third node of the plurality of nodes is configured to determine that the stored second digital certificate is issued to the referenced third ID, and further communicate the stored second digital certificate to a different client device associated with the referenced third ID.

15. The system of claim 14, wherein the different client device associated with the referenced third ID is configured to provide for display the communicated second digital certificate as another indication that the stored dataset is verified by the second ID.

16. A non-transitory computer storage medium storing computer-useable instructions that, when used by a first node, cause the first node to perform operations comprising:
determining, by the first node, that a dataset stored on a distributed ledger references a first ID associated with the first node, wherein the stored dataset is associated with a second ID;
receiving, by the first node, a command from a first client device associated with the referenced first ID, the received command corresponding to the stored dataset;
generating, by the first node, a first digital certificate corresponding to the stored dataset based on the received command, the generated first digital certificate being issued to the second ID from the referenced first ID; and
storing, by the first node, the generated first digital certificate on the distributed ledger, wherein the first node is one of a plurality of nodes configured to store the generated first digital certificate on the distributed ledger,
wherein a user node of the plurality of nodes is configured to communicate the stored first digital certificate to a second client device associated with the second ID based on a determination that the stored first digital certificate is issued to the second ID, and
wherein the second client device is configured to provide for display the stored dataset included in the communicated first digital certificate as an indication that the stored dataset is verified by the referenced first ID.

17. The non-transitory computer storage medium of claim 16, wherein the generated first digital certificate includes the stored dataset.

18. The non-transitory computer storage medium of claim 17, wherein the first digital certificate is received as a graphical user interface element for presentation via a user interface.

19. The non-transitory computer storage medium of claim 16, further storing the computer-useable instructions that, when used by a first node, cause the first node to perform operations comprising:
    based on the determination that the stored dataset references the first ID, communicating, by the first node, a generated notification including a request to verify the stored dataset to the first client device.

20. The non-transitory computer storage medium of claim 19, wherein the command is received via a user interface generated by the first node and provided to the first client device.

\* \* \* \* \*